US005349439A

United States Patent [19]

Graindorge et al.

[11] Patent Number: 5,349,439

[45] Date of Patent: Sep. 20, 1994

[54] OPTO-ELECTRONIC MEASURING DEVICE WITH OPTICAL AIR WEDGE SPECTRAL ANALYSIS ARRANGEMENT

[75] Inventors: Philippe Graindorge, Crimolois; Denis Trouchet, Le Pecq, both of France

[73] Assignee: Photonetics, Marly le Roi, France

[21] Appl. No.: 860,997

[22] Filed: Mar. 31, 1992

Related U.S. Application Data

[63] Continuation-in-part of Ser. No. 466,625, Jan. 17, 1990, abandoned.

[51] Int. Cl.[5] .......... G01B 9/02

[52] U.S. Cl. .......... 356/346; 356/351; 356/349; 356/419

[58] Field of Search .......... 356/346, 351, 349, 356, 356/358, 419

[56] References Cited

U.S. PATENT DOCUMENTS

| | | | |
|---|---|---|---|
| 3,549,260 | 12/1970 | Barringer | 356/351 |
| 4,867,565 | 9/1989 | Lequime | 356/351 |
| 4,932,782 | 7/1990 | Graindorge et al. | 356/356 |
| 5,155,552 | 10/1992 | Fortunato et al. | 356/346 |

OTHER PUBLICATIONS

Bosselmann et al. "Multi-Fiber-Coupled Interferometric Position Sensor", *OPTO 85,* Paris May 21-23, 1985, pp. 168-169.

*Primary Examiner*—Samuel A. Turner
*Assistant Examiner*—LaCharles Keesee
*Attorney, Agent, or Firm*—Hill, Steadman & Simpson

[57] ABSTRACT

A measuring device comprises a light source with a wide spectrum feeding an optical sensor through an optical fiber. The sensor comprises an interferometer adjusted to a dull tint and an optical component sensitive to a measured parameter, which may be either a pressure, a measured displacement or an index of refraction of a fluid, a readout device includes the photodetector, a processing unit and an optical wedge for producing fringes, whose lateral positions, in contrast, are representative of the spectrum of the flux leaving the interferometer and analyzed by the photodetector. The processing unit measures the lateral position of the fringe and converts it into a value of the parameter P.

16 Claims, 5 Drawing Sheets

10
P
13
15
12
14
16
17
20
30
36
35
34
42
41
31
50
37
32
33
11

OPTO-ELECTRONIC MEASURING DEVICE WITH OPTICAL AIR WEDGE SPECTRAL ANALYSIS ARRANGEMENT

CROSS REFERENCE TO RELATED APPLICATIONS

This is a continuation-in-part of our copending U.S. patent application Ser. No. 07/466,625, which was filed Jan. 17, 1990 and now abandoned.

BACKGROUND OF THE INVENTION

The invention relates to an opto-electronic measuring device with spectrum coding.

With this type of device, parameters can be measured, such as the temperature, pressure, position of an object or of an element.

In a device of this type, a variation of the measured parameter introduces a variation of the travel difference in an interferometer adjusted to a dull tint and illuminated by a wide spectrum light source. The spectrum of the light flux at the output of the interferometer depends on the travel difference and so on the value of the measured parameter. Analysis of the spectrum of this flux gives access to the value of the parameter.

Numerous means have been proposed for carrying out such analysis; in particular, an article by Arditty, Bosselmann, Ulrich entitled "Multimode fiber coupled interferometric position sensor" (OPTO 1985, May 21–23, 1985, pp. 168–169), proposed using a MICHELSON interferometer to carry out this analysis. In this interferometer, also adjusted to a dull tint, measurement of the relative position of the mirrors, when the lateral contrast rise of the interferogram appears, corresponds to the introduction by this interferometer of a travel difference equal and of opposite sign to that introduced by the first interferometer. Thus, the travel difference is obtained and so the value of the parameter which it is desired to measure.

U.S. Pat. No. 4,867,565 to Lequime discloses an optical detection device including a sensor of the interferometric type having a birefringent active medium, which is subjected to the parameter to be measured. This sensor is linked by an optical fiber to a static optical demodulation system, essentially constituted by a set of birefringent elements placed between a polarizer and an analyzer.

This device is complex, suffers the drawbacks resulting from the use of polarized light, that can have only half of the power of an unpolarized source. Furthermore, birefringent elements have a high thermal dependence, that makes the device dependent of the temperature.

This device also faces problems of dispersion due to the strong wavelength dependence of the material birefringence.

U.S. Pat. No. 3,549,260 to Barringer discloses the use of a simple optical wedge to form interference of Fizeau fringes. It can be a wedge-shaped air space formed by a pair of thin transparent plates.

SUMMARY OF THE INVENTION

It is an object of the invention to provide an optical measuring device comprising a coding spectrum interferometer and a sensitive or readout interferometer, that does not suffer the drawbacks of the previous known devices, and that gives a sensible and precise measure in most circumstances, even when temperature varies.

The present invention provides a static detection system whose adjustment and use are particularly simple. For this, the invention relates to a measuring device comprising an optical sensor, said sensor including a wide spectrum light source feeding, through an optical fiber, into an interferometer adjusted to a dull tint, an optical component sensitive to the measured parameter and introducing in the interferometer a travel difference depending on the value of the measured parameter, an optical fiber connecting the sensor to means for analyzing the light flux leaving the interferometer, said analysis means comprising a photodetector and a unit for processing the signals delivered by this photodetector.

According to the invention, the analysis means comprises optical wedge producing fringes, whose lateral position and contrast are representative of the spectrum of the flux leaving the interferometer and analyzed by the photodetector. The processing unit measures the position of the channeled spectrum and converts it into the value of parameter P.

Other advantages and features of the invention will be readily apparent from the following description of the preferred embodiments, the drawings and claims.

DESCRIPTION OF THE PREFERRED EMBODIMENTS

Figure 1:
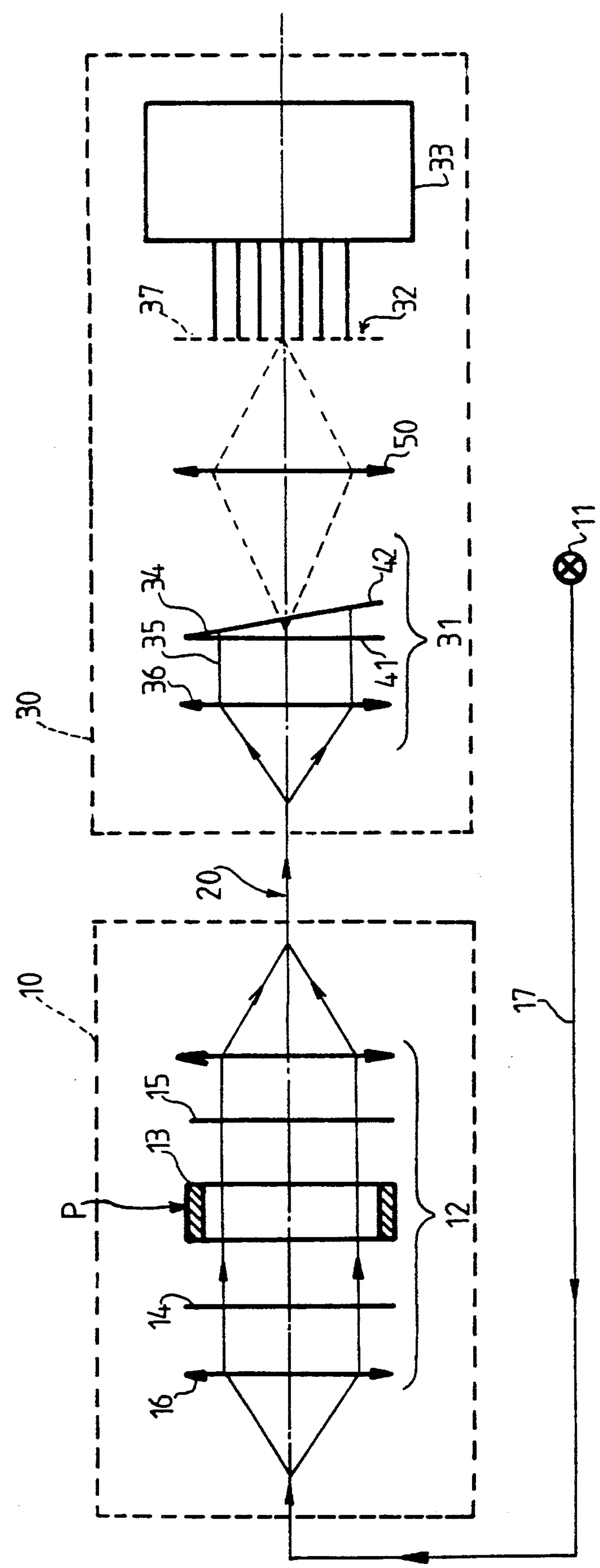
FIG. 1 is a schematic view of the whole of the measuring device.

The measuring device of the invention comprises a sensor 10 including an interferometer 12 adjusted to a dull tint, and an optical component 13 sensitive to the measured parameter P and introducing in the interferometer a path difference depending on the value of this parameter.

Source 11 feeds sensor 10 through the fiber or the optical fiber system 17.

The interferometer may be of different types, a two-wave interferometer or a multiple-wave interferometer adjusted to a dull tint, so that it produces a uniform effect on the whole of the incoming beam. This interferometer 12 may be a polarimeter formed of a polarizer 14 and an analyzer 15, the optical component 13 then comprising a birefringent element, whose properties vary depending on the value of parameter P. This may be a crystal of KdP, $LiNbO_3$. The interferometer or the polarimeter may operate by transmission, as shown, or else by reflection.

Figure 6:
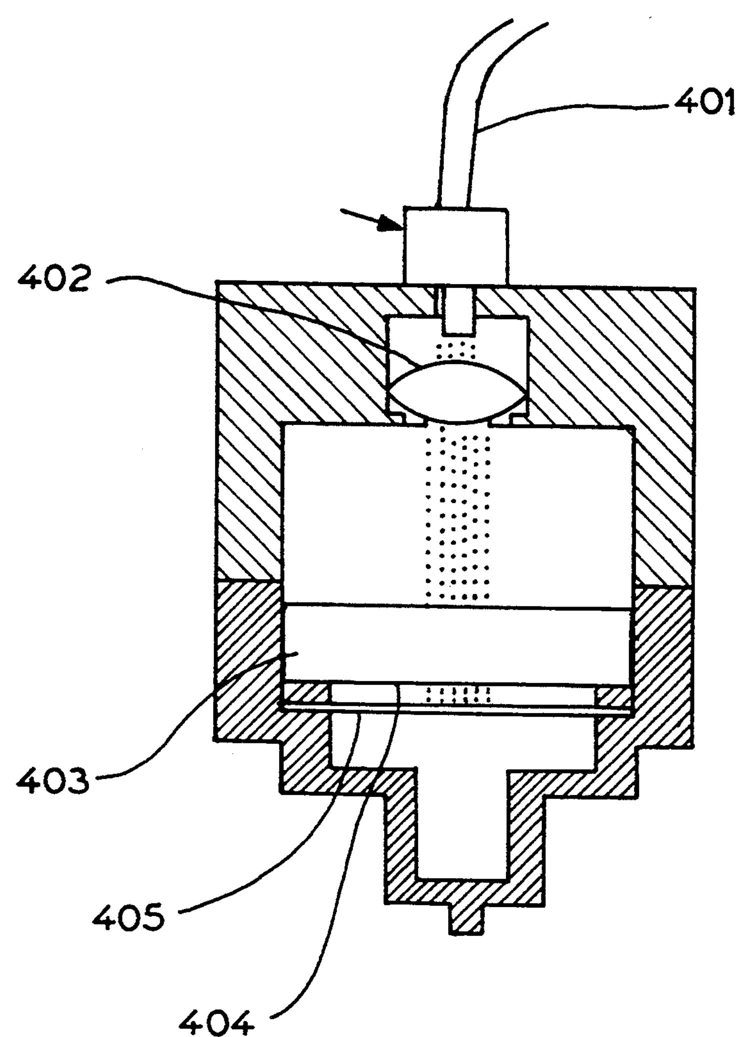
FIG. 6 is a schematic representation of a pressure sensitive interferometer.

FIG. 6 represents an encoding Fizeau interferometer for pressure measurement. This interferometer sensor is known in itself as an isolated device and light comes in from the souce through the fiber 401. Its beam is collimated by lens 402. It comes through substrate 403, whose face 404 is flat and partially reflective and is reflected by diaphragm 405. Interferences are formed by multiple reflection of light on flat 404 and diaphragm 405 causing spectrum encoding of the reflected beam, that comes out back through fiber 401. The position of diaphragm 405 relative to flat 404 depends on a difference of pressures exerting on the faces, so that the spectrum encoding depends on the pressure P.

An encoding Fizeau interferometer also makes it easy to measure either displacement or an index of refraction for a fluid. When measuring a displacement, one of the faces of the Fizeau interferometer is moved relative to the other and this displacement is encoded on the spectrum of the beam. When measuring an index of refraction of a fluid, the gas fills the space between the two faces of the Fizeau interferometer, so that the encoding of the spectrum depends on the index of refraction of the fluid.

The light source 11 (FIG. 1) is preferably a light-emitting diode or an incandescent source. In some cases, the beam which it emits enters directly in the interferometer 10. In other cases, it is preferable to extend the beam by means of an optical system 16.

The light flux at the output of the interferometer 10 is transmitted by an optical fiber system 20 to the readout means 30. The optical fiber system 20 is advantageously formed of a multimode fiber.

The readout means comprises a second interferometer 31 producing an interferogram representative of the spectrum of the flux transmitted by the fiber system 20.

The signals leaving this second interferometer 31 are fed through photodetector 32 to an electronic processing unit 33, which displays the value of the measured parameter or delivers an electric value representative of this parameter.

According to the invention, the interferometer 31 is formed by an optical wedge 34, which receives an incident light flux 35 produced by the optical system 36 from the light flux leaving the optical fiber system 20.

The optical wedge 34 is formed by two plates or diopters 41 and 42 slanted slightly with respect to each other. Between them is gas, such as air, that may be under low pressure, so that an air wedge is delimited by the diopters. A light flux 43 (FIG. 2) of parallel light incident on such an optical wedge is partially transmitted and also reflected by the two diopters 41 and 42, thus, producing two beams 44 and 45, which interfere and produce interference fringes 46. The interference fringes forming this channeled spectrum are localized at the level of the optical wedge. The photodetector 32 (FIG. 1) used for their analysis may be either located directly in the vicinity of the optical wedge, or it may be preferred to use an optical system 50 (FIG. 1) providing the optical conjugation of said fringes with the receiving surface of the photodetector and, thus, permitting the latter to be moved away from the optical wedge 34.

The quality of the fringe system obtained is optimized when the optical effect corresponding to the central fringe is the exact equivalent of that introduced by interferometer 12. Thus, when the interferometer 12 is a Fizeau interferometer, wedge 34 is an air wedge. The Fizeau interferometer has two faces, each having a coefficient of reflectivity. The faces of the air wedge have the same coefficients of reflectivity as those of the Fizeau interferometer.

The fringes produced by wedge 34 are parallel at its intersecting edge. For analyzing the, the photodetector 32 acquires a signal representative of a single fringe and compares its level with those of the signals corresponding to adjacent fringes. The photodetector 32 may be formed of elementary detectors 37 of sufficiently small dimensions. It is, for example, one or more strips, or a matrix of charge transfer devices (called CCD), or an assembly of discrete photodetectors. This photodetector 32 may also be a cathode ray tube.

Figure 2:
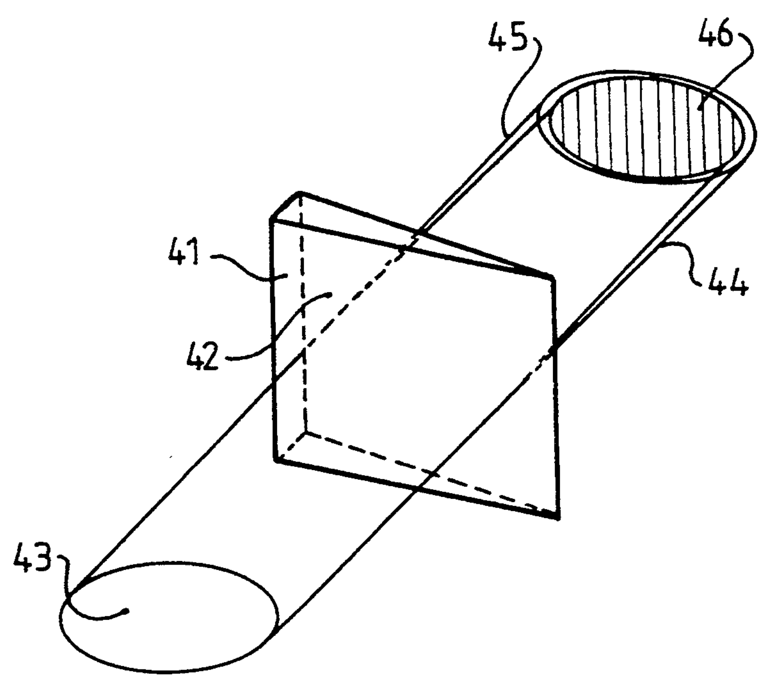
FIG. 2 shows a general diagram of how fringes are obtained by means of an optical wedge.
Figure 3:
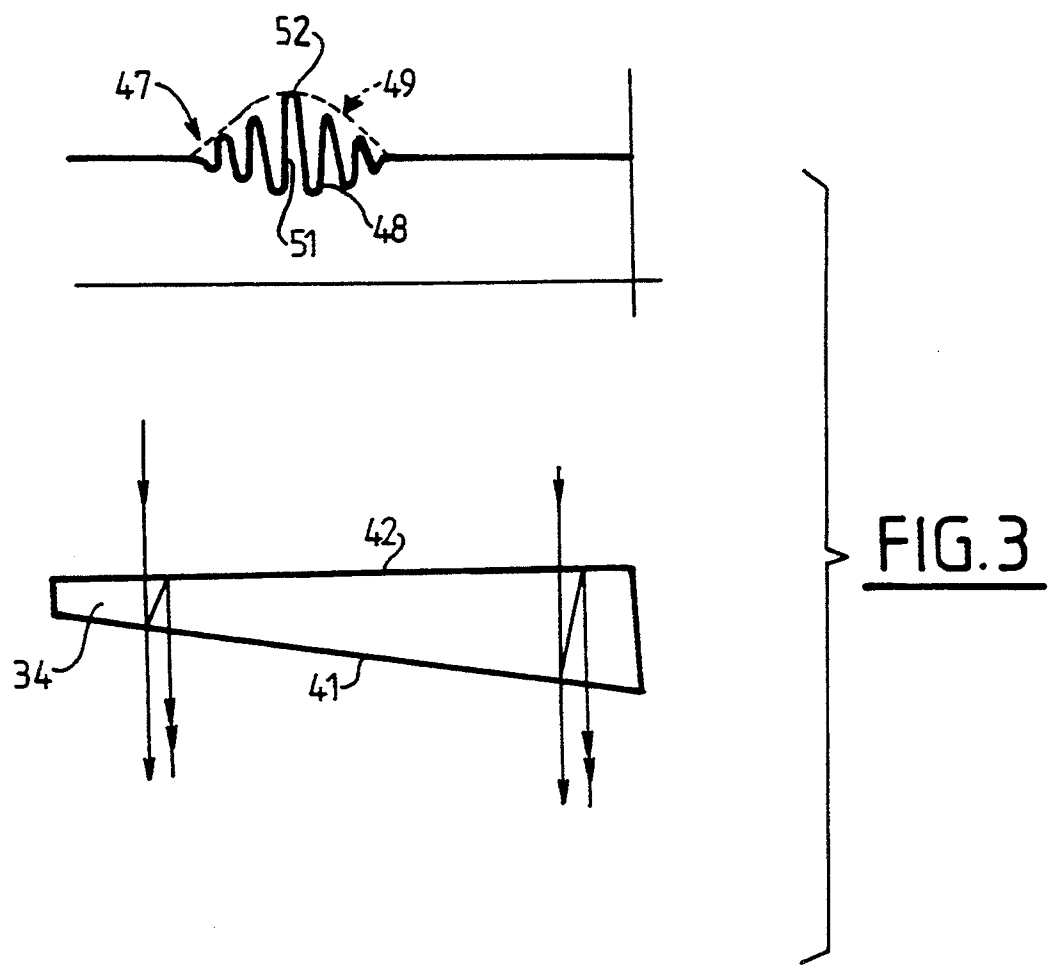
FIG. 3 shows the fringes with respect to the optical wedge.
Figure 5:
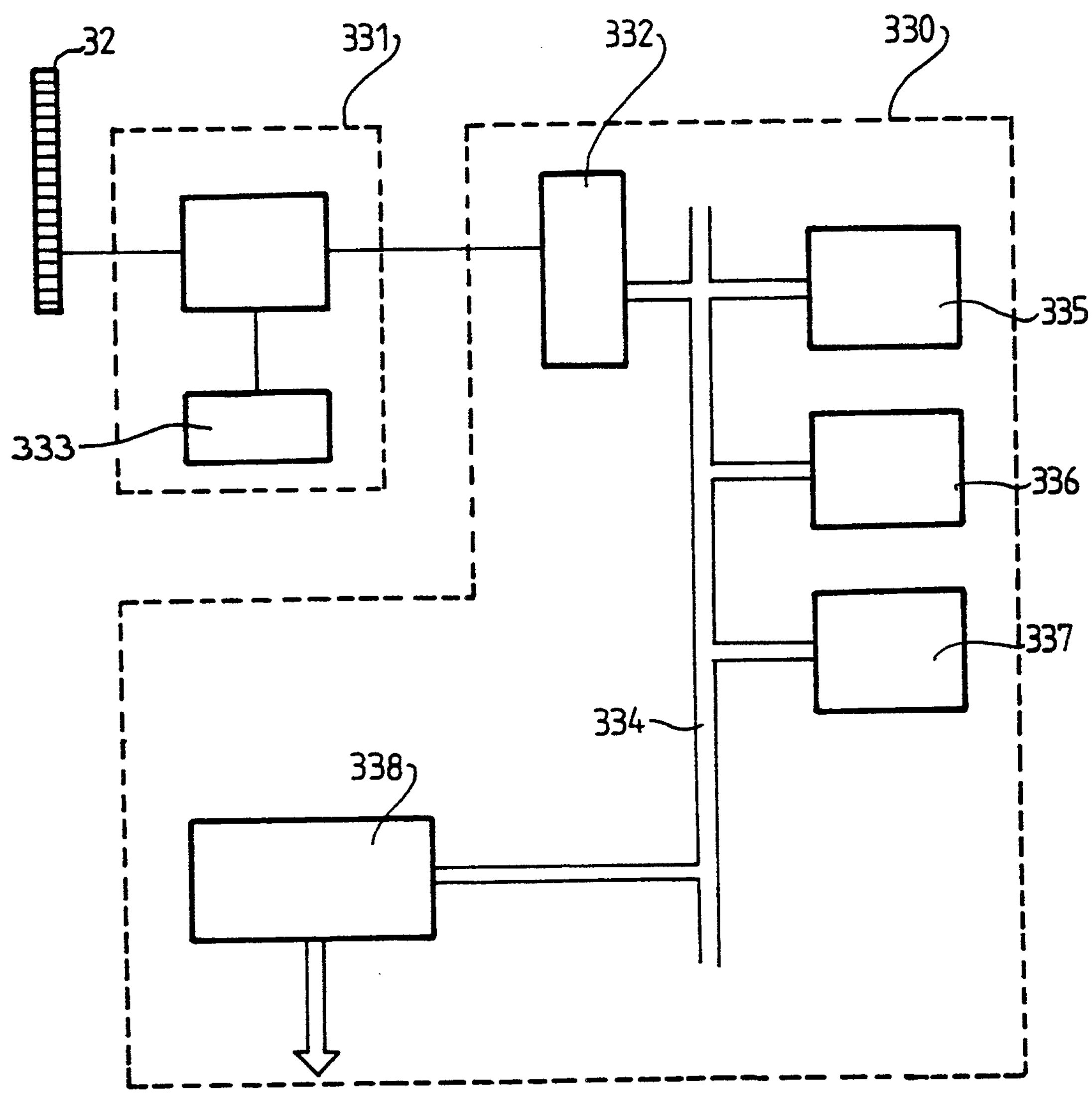
FIG. 5 is a schematic representation of one embodiment of the processing unit.

Wedge 34 may be used for transmission, such as shown in FIGS. 2 and 3.

The interferogram delivered by the interferometer 31 has the form shown in FIG. 3, in which the position of the fringes, in the direction perpendicular to the intersecting edge of prism 34, has been shown in abscissa and the energy of the light signal in ordinates.

This interferogram 47 is formed of fringes 48, whose envelope is the curve 49. The form of the curve 49 depends on the spectrum of source 11, and its position, i.e., for example, the position of its maximum 52 or the maximum of the central fringe 51, depends on the travel difference introduced by element 13 in the interferometer 12 and so on the value of parameter P, which it is desired to measure.

With photodetector 32 acquiring by means of the processing unit 33 data representative of curve 49, the purpose of this processing unit 33 is to seek, depending on the case, either the position of the central fringe 51, or the position of the maximum 52 of the envelope. It then delivers an electric signal representative of this value and so of the value of parameter P, which may be used for any desired purpose, for example for displaying the value of parameter P.

Numerous embodiments of the processing unit 33 are possible. Preferably, this processing unit 33 comprises a microprocessor card 330 fed from photodetector 32 through a specialized electronic card 331. The specialized card 331 comprises a clock 333. The microprocessor card 330 comprises an A-D converter 332, a bus 334, a RAM 335, a processor 336 and a programmable memory of a PROM type 337. The specialized card 331 transmits to the microprocessor card data directly available on bus 334, which makes it possible to load this data in real time in the RAM 335. This data is analyzed by processor 336 using a program contained in memory 337. An interface 338, which may, for example, be of RS type 232, provides external communication for the transmission of data. The purpose of this program is to seek the position of the fringes, so as to derive therefrom the value of parameter P.

For this, it seeks first of all the envelope or curve 49 of the fringes, then, by successive approximations, determines the height of the highest fringe. From this height, the lateral position of the contrast maximum and so of the parameter P may be determined.

The form of each of fringes 48 depends on the reflection coefficient and diopters forming the optical wedge 34. In the case of the air wedge, a high reflection coefficient provides operation of "Fabry-Perot" type producing fine fringes, whereas a low reflection coefficient leads to "Fizeau" type operation, namely substantially sinusoidal fringes. The two types of operation are possible. However, operation of an intermediate type with reflection coefficients of 30% to 40% will generally be preferred.

Figure 4:
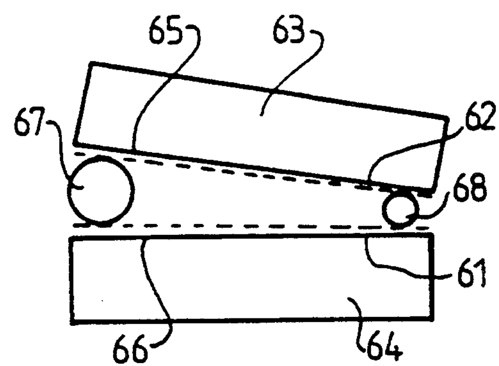
FIG. 4 is a general diagram of forming an air wedge.

An air wedge is formed, such as shown in FIG. 4, by means of two optical plates 63 and 64, each having a flat face 65, 66 disposed face-to-face, and each covered by a treatment 61, 62 and separated by two cylindrical spacers 67, 68 of different diameters. As we saw above, the choice of treatment determines the reflection coefficient and so the form of each of the fringes 48, the angle between faces 65 and 66 determines the spacing of these fringes 48. Spacers 68 and 67 may advantageously be formed of optical fiber elements.

In a preferred embodiment, sufficient detection accuracy is obtained, when the width of a fringe 48 corresponds at least to the width of four elementary detectors 37. When the mean wavelength of source 11 is about 0.6 micron, a prism having an angle of about 0.005 radian produces a fringe system, whose interfringe is about 60 microns. It is then possible to use elementary detectors 37 of a width of 15 microns. It is preferable for the angle of incidence of the light flux on the optical wedge 34 to be zero with respect to the normal, which overcomes aberrations of the plate.

The optical system 50 may be a conventional optical system producing an image of the plane of the fringes on detector 32.

Two cylindrical lenses may also be used, the first one with axis parallel to the intersecting edge of wedge 34 having a focal length for matching the spacing of the fringes to the dimensions of the elementary detectors 37, and the second perpendicular to the first one concentrating the energy contained in these fringes.

In order to increase the resolution of the analysis system for a given angle of wedge 34 and a given dimension of the elementary detectors 37, between wedge 34 and detector 32, may be placed a pattern of opaque lines, whose spacing is equal to the spacing of the fringes leaving the wedge-shaped interferometer, and in which the lines are parallel to the interference fringes. This pattern also called RONCHI network makes it possible to use a MOIRE method: when the opaque pattern is positioned so that it masks the dark fringes, the signal produced represents the positive variations about the mean value, whereas when it masks the light fringes, it delivers a signal representative of the negative variations. This signal is then averaged so as to obtain a monotonic signal, whose maximum or minimum will be situated at the position of the maximum contrast.

On the other hand, when the pattern is in quadrature with respect to the fringes, the signal produced, which is uniform, cannot be used. To avoid this difficulty, two RONCHI networks are used in quadrature with respect to each other, and each placed in front of a strip of elementary detectors 37. At least one of the strips then delivers a usable signal. The signal which has the largest drift is the one for which the phase matching is best and which is used.

Another possibility consists in multiplexing the two signals corresponding to RONCHI networks in quadrature on the same detector. For this, a network formed of zones of the width of an elementary detector 37, alternately in phase and in quadrature, is used. At the output of the strip formed of a set of elementary detectors 37, the signal is demodulated and gives at least one usable signal.

The measuring device does not rely on polarization. The precision and sensitivity of the measure does not depend on the polarization state of the measure, neither of its variations.

The air wedge makes a readout that does not depend on temperature. As a matter of fact, its thermal stability depends only on the length stability of the spacers, which are approximately $5\times10^{-7}$° C. in the case of silica.

Choosing reflectivity of the wedge surfaces is easy and allows a control of the transfer function of the readout interferometer and the optimization of the measuring device.

Low reflectivity gives one a transfer function very similar to a transfer function of a two-wave interferometer. A high reflectivity gives one a transfer function, such as a transfer function of a Fabry-Perot.

Although various minor modifications may be suggested by those versed in the art, it should be understood that we wish to embody within the scope of the patent granted hereon all such modifications as reasonably and properly come within the scope of our contribution to the art.

We claim:

1. A measuring device comprising a light source with a wide spectrum feeding an optical sensor through an optical fiber, said optical sensor comprising an interferometer adjusted to a dull tint, an optical component sensitive to a measured parameter P and introducing in the interferometer a path difference depending on the measured parameter P, an optical fiber connection connecting the sensor to means for reading out the spectrum of the light flux leaving the interferometer, said means for reading out comprising photodetector means being formed of elementary detectors, and processing means, the means for reading out including an optical air wedge being formed by two flat plates being positioned at a slight angle with respect to each other to produce fringes, whose lateral position and contrast are representative of the spectrum of the light flux leaving the interferometer and analyzed by the photodetector means, the processing means measuring the lateral position of said fringes and converting said lateral position into the value of parameter P.

2. A measuring device according to claim 1, wherein the two flat plates are separated by two cylindrical spacers of different diameters.

3. A measuring device according to claim 1, wherein said interferometer of the optical sensor is selected from a Fabry-Perot interferometer and a Fizeau interferometer.

4. A measuring device according to claim 1, wherein faces of the two flat plates of the optical wedge have a coefficient of reflectivity between 30% and 50%.

5. A measuring device according to claim 1, wherein an incident beam of light flux is normal to an input face of the optical wedge.

6. A measuring device according to claim 1, wherein the processing means makes it possible to know the position of the central fringe of the signal by detecting the contrast maximum.

7. A measuring device according to claim 1, wherein the processing means makes it possible to know the position of the central fringe of the interference system by detecting the maximum of the envelope of the signal.

8. A measuring device according to claim 1, which includes one or more analysis grids for forming MOIRE figures being inserted between the fringes produced by the optical wedge and the photodetector means.

9. A measuring device according to claim 1, wherein the photodetector means is located directly in the vicinity of the optical wedge.

10. A pressure measuring device, comprising a light source with a wide spectrum feeding an optical sensor through an optical fiber, said optical sensor comprising an interferometer adjusted to a dull tint, an optical component sensitive to a measured pressure P and introducing in the interferometer a path difference depending on the measured pressure P, an optical fiber connection connecting the sensor to means for reading out the spectrum of the light flux leaving the interferometer, said means for reading out consisting of a photodetector, a processing unit, and an optical air wedge being formed by two flat plates being positioned at a slight angle with respect to each other to produce fringes, whose lateral position and contrast are representative of the spectrum of the light flux leaving the interferometer and analyzed by the photodetector, the processing unit measuring the lateral position of said fringes and converting lateral position into the value of pressure P.

11. A measuring device comprising a light source with a wide spectrum feeding an optical sensor through an optical fiber, said optical sensor comprising a Fizeau interferometer adjusted to a dull tint, said Fizeau interferometer having two faces with each face having a reflectivity coefficient, an optical component sensitive to a measured parameter P and introducing in the interferometer a path difference depending on the measured parameter P, an optical fiber connection connecting the sensor to means for reading out the spectrum of the light flux leaving the interferometer, said means for reading out consisting of a photodetector a processing unit and an optical air wedge being formed by two fiat plates being positioned at a slight angle with respect to each other to produce fringes, each of said flat plates of the air wedge having a reflectivity coefficient which is respectively equal to the reflectivity coefficient of one face of the Fizeau interferometer, the lateral position and contrast of the fringes being representative of the spectrum of the light flux leaving the interferometer and analyzed by the photodetector, the processing unit measuring the lateral position of said fringes and convening said lateral position into the value of parameter P.

12. In a measuring device according to claim 11, wherein faces of the two flat plates of the Fizeau interferometer and of the optical wedge have a coefficient of reflectivity between 30% and 50%.

13. In a measuring device according to claim 11, wherein an incident beam of light flux is normal to an input face of the optical wedge.

14. A pressure measuring device comprising a light source with a wide spectrum feeding an optical sensor through an optical fiber, said optical sensor comprising a Fizeau interferometer adjusted to a dull tint, said Fizeau interferometer having two faces with each face having a reflectivity coefficient, an optical component sensitive to a measured pressure P and introducing the interferometer a path difference depending on the measured pressure P, an optical fiber connection connecting the sensor means to means for reading out the spectrum of the light flux leaving the interferometer, said means for reading out consisting of a photodetector, a processing unit and an optical air wedge being formed by two flat plates being positioned at a slight angle with respect to each other to produce fringes, each of said flat plates of the air wedge having a reflectivity coefficient which is respectively equal to the reflectivity coefficient of one face of the Fizeau interferometer, the lateral position and contrast of the fringes being representative of the spectrum of the light flux leaving the interferometer and analyzed by the photodetector, the processing unit measuring the lateral position of said fringes and converting said lateral position into the value of pressure P.

15. A measuring device according to claim 1, wherein the processing means measures the lateral position by measuring a maximum of an envelope of said fringes.

16. A measuring device according to claim 1, wherein the processing means measures the lateral position by measuring the lateral position of a central fringe.

* * * * *